United States Patent [19]
Korhonen et al.

[11] Patent Number: 6,023,740
[45] Date of Patent: Feb. 8, 2000

[54] HANDLING INTERRUPTS IN A SYNCHRONOUS ENVIRONMENT

[75] Inventors: Jari Korhonen, Karjaa; Veikko Toukomies, Espoo, both of Finland

[73] Assignee: Nokia Telecommunications Oy, Espoo, Finland

[21] Appl. No.: 08/981,643

[22] PCT Filed: Jul. 10, 1996

[86] PCT No.: PCT/FI96/00407

§ 371 Date: Jan. 8, 1998

§ 102(e) Date: Jan. 8, 1998

[87] PCT Pub. No.: WO97/03402

PCT Pub. Date: Jan. 30, 1997

[30] Foreign Application Priority Data

Jul. 11, 1995 [FI] Finland ................................. 953400

[51] Int. Cl.$^7$ .................................................. G06F 13/14
[52] U.S. Cl. ............................ 710/45; 710/48; 710/124; 710/260
[58] Field of Search ................................. 395/865, 867, 395/868, 553, 555, 559, 183.1

[56] References Cited

U.S. PATENT DOCUMENTS

| | | | |
|---|---|---|---|
| 4,580,261 | 4/1986 | Pelotte | 370/438 |
| 4,994,960 | 2/1991 | Tuchler et al. | 710/269 |
| 5,280,628 | 1/1994 | Nakayama | 710/260 |
| 5,568,649 | 10/1996 | MacDonald | 395/868 |
| 5,708,850 | 1/1998 | Staros | 395/868 |

FOREIGN PATENT DOCUMENTS

| | | | |
|---|---|---|---|
| 117 442 | 9/1984 | European Pat. Off. | 13/372 |

OTHER PUBLICATIONS

IBM Technical Disclosure Bulletin, vol. 35, No. 6, Nov. 1992, IBM Corp., "Time Division Multiplexed Vectored Interrupt", p. 478.

International Patent Classification, Sixth Edition (1994), alaryhma 13/372, sivu 177.

*Primary Examiner*—Meng-Ai T. An
*Assistant Examiner*—Stacy Whitmors
*Attorney, Agent, or Firm*—Pillsbury Madison & Sutro LLP; IP Group

[57] ABSTRACT

The invention relates to a method and system by means of which a large number of peripheral modules (TRn) can request service from a controller, e.g. in form of an interrupt request. Congestion of service requests is prevented in advance by assigning a predetermined time slot to each peripheral module (TRn) during which it is allowed to ask for service from the controller. The time slots are coordinated by a time slot counter which is stepped with a clock signal (CLK). The time slot counters of the different peripheral modules are synchronized with a synchronization signal (SYNC). The peripheral modulees (TRn) may include subperipheral modules, whereby each subperipheral module can request service independently, or a gate N1 coupled to a register SR1 may be employed for detecting that a subperipheral module requires service.

13 Claims, 4 Drawing Sheets

HANDLING INTERRUPTS IN A SYNCHRONOUS ENVIRONMENT

This application is the national phase of international application PCT/Fl96/00407 filed Jul. 10, 1996 which designated the U.S.

BACKGROUND OF THE INVENTION

The present invention relates to digital systems in which a controller has to serve a plurality of peripheral modules.

In digital systems, such as computers, peripheral modules can ask for service from a central module, i.e. a controller; by means of interrupts. In prior art systems, for example in personal computers of industrial standards, there is a dedicated interrupt line allocated to all peripheral modules that are to be given the option to request an interrupt. For example, the personal computers have 15 interrupt lines. Although this is usually adequate for PCs, in other kinds of environments, such as mobile services switching centers and particularly transcoders coupled to them, need often arises to serve even hundreds of peripheral modules requesting an interrupt. To arrange a separate interrupt line for such a large number of peripheral modules would definitely be irrational.

A large number of peripheral modules are also served in local area networks. In an Ethernet type of a network, for example, a connecting cable has three states used to identify the number of modules that have reserved the cable: zero, one, or more than one. Most digital circuits only handle two voltage states, which means that carrying out a service request the way it is done in the Ethernet network considerably increases the cost of the apparatus. Another drawback of reserving turns in this manner is that only a fraction of the connecting line transfer capacity can in practice be utilized, because if several modules ask for service at the same time, the service requests of all the modules will be futile, with the result that they all have to wait for a random time before any new attempts.

It is possible to prevent an Ethernet type of apparatus from becoming blocked in systems that are based on reserving turns, for example in a Token Ring network in which the turn circulates from one device to another in the system. This arrangement, too, is expensive if applied to a plurality of modules, because the logic that is used to handle the interrupt turn must be installed in every device.

A method for arranging an interrupt option for several peripheral modules is proposed in the article "Internal communications in a multiprocessor ISDN PBX", Carlos Hirsch & Luis Rojas, Computer Communications, Vol. 18, Number 5, May 1995. In the system described in the article, each peripheral module is allocated a predetermined time-slot during which it may request an interrupt. As far as the connections between peripheral modules are concerned, this system, too, is rather burdensome to implement due to the handling of interrupts requiring $\log_2 n$ lines if there are n peripheral modules.

SUMMARY OF THE INVENTION

It is an object of the present invention to solve the aforementioned problems, and to offer an efficient and easily applicable solution for distributing interrupt turns to a large number of peripheral modules requesting interrupts.

From another point of view, the invention offers a method and system by means of which a plurality of peripheral modules can ask for service from a common controller.

From a third point of view, the invention offers a comprehensive solution to handshaking associated with requesting and serving an interrupt.

The invention is based on preventing, in advance, simultaneous interrupt requests from being produced by giving each peripheral module that will possibly request an interrupt a dedicated time-slot during which it is allowed to request the interrupt. Each peripheral module independently operates so that it will only request an interrupt when permitted.

According to a further embodiment, in hierarchical systems having peripheral modules with subperipheral modules, the time slots can also be correspondingly divided into sub-time slots.

BRIEF DESCRIPTION TO THE DRAWINGS

In the following, the invention will be described by means of preferred embodiments, with reference to the attached drawings in which.

FIG. 1 is a chart illustrating an expected value for delay as the number of peripheral modules increases, FIG. 2 illustrates coupling the system of the invention to external circuits, FIG. 3 is a simplified block diagram of the system according to the invention for handling interrupts in digital signal processors, FIG. 4 illustrates the circuit of FIG. 3 supplemented, and FIG. 5 illustrates applying the invention in a general case.

DETAILED DESCRIPTION

Figure 1:
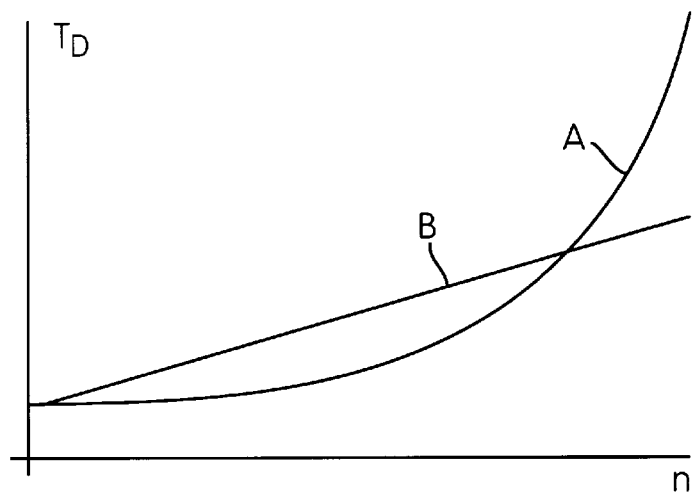

FIG. 1 is a chart illustrating an expected value for delay as the number of peripheral modules increases. Graph A shows the expected value for the delay in an environment where the peripheral modules may interrupt at a random moment in time. As the number n of the peripheral modules increases, the expected value for the delay approaches infinity because an ever increasing amount of time is wasted due to several peripheral modules asking for service simultaneously, whereby the attempt will be futile for all the modules. Graph B shows the expected value for the delay in an environment where the peripheral modules may only interrupt in their turn, and the interrupt turn circulates via n peripheral modules in the system. In this case, the expected value for the delay increases linearly as the value of n increases. With low values of n, the free interrupt alternative depicted by graph A is better. With high values of n, the cyclic interrupt turn depicted by graph B is better.

To better illuminate the invention, the embodiments thereof are described in connection with a transcoder coupled to mobile services switching centers, but it is obvious that the invention is applicable to any environment in which a controller has to serve a plurality of interrupting peripheral modules.

Figure 2:
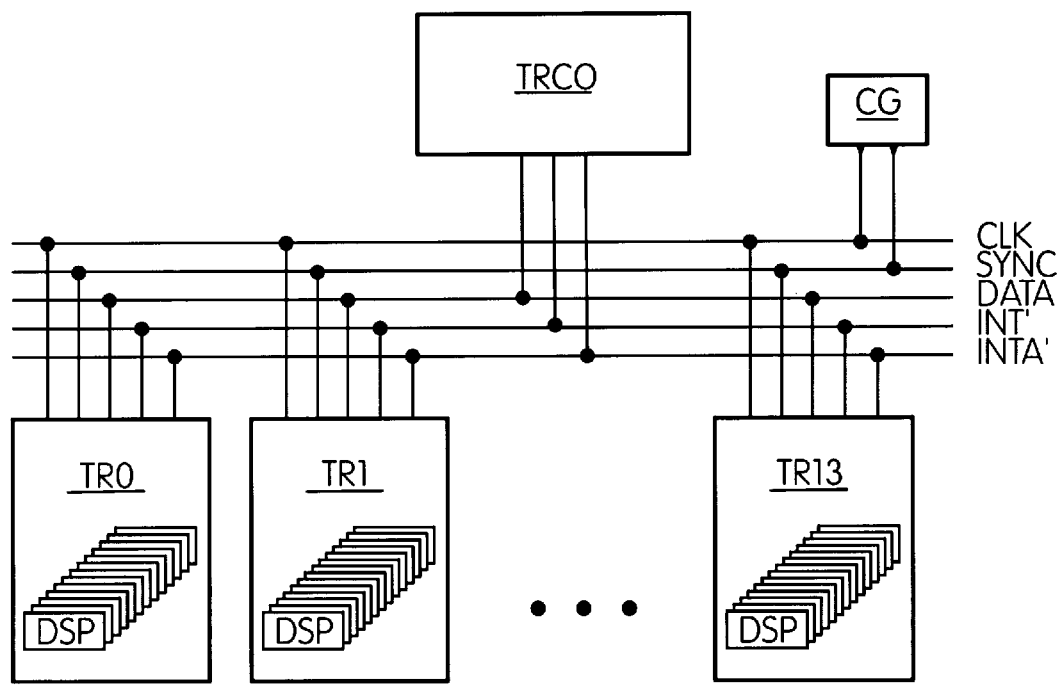

FIG. 2 illustrates signals employed by the system. As far as the invention is concerned, the essential parts in this exemplary block diagram are a transcoder controller TRCO and 14 transcoder units TRO–TR13, each unit having 16 digital signal processors DSPn. Hence, there are 224 digital signal processors DSPn. Naturally, it is possible to install a smaller number of units in the system. The reason why there are 14 transcoder units is that one 64 kbps line can convey 14 calls coded in the half-rate of 6,5 kbps.

In this example, the interrupt sources, i.e. peripheral modules possibly requesting an interrupt from the controller TRCO, are the transcoder units TR0–TR13, TRn in short. They request an interrupt with an INT' signal. The controller TRCO indicates to begin serving the interrupt with an interrupt acknowledgement signal INTA'. Each unit TRn will have to request an interrupt whenever any of its signal processors DSPn requires service. Therefore, there are altogether 224 possible causes for an interrupt.

The interrupt turns are coordinated by means of two clock signals, CLK and SYNC, being present in the exemplary apparatus for other purposes as well. As far as the invention is concerned, they are used to make sure that the interrupt sources have the same view of time. In FIG. 2, the signals CLK and SYNC are represented as outputs from a clock generator CG. As far as the invention is concerned, it is not significant whether the clock generator CG is internal or external to the TRCO.

An interrupt source informs the identifiers of the unit TRn that requested the interrupt and the signal processor DSPn by using the data bus DATA. Like the clock signal the data bus, too, has been installed in the system for other uses as well, which means that the only signals reserved for handling an interrupt are the interrupt request signal INT' and the interrupt acknowledgement signal INTA'.

The frequency of the CLK signal is the frequency of the SYNC signal multiplied by a power of two, the power of two at least equalling the number of interrupt sources. As there may be 224 interrupt sources in the example, the frequency of the clock signal must be at least 256 times the frequency of the SYNC signal. By setting the ratio of signals CLK and SYNC to be a power of two, the logic associated with assigning interrupt turns can be maintained as simple as possible. In the exemplary apparatus, the SYNC signal has the frequency of 8 kHz and the CLK the frequency of 8,192 MHz.

The period between SYNC pulses is divided into equal intervals between the different interrupt sources. The interrupt sources ask for an interrupt by the INT' signal which each interrupt source may only activate in its turn. Prior to activating the INT' signal, the interrupt sources make sure that the INT' is not currently active. Such a situation would indicate a fault in the apparatus.

When the controller detects an active INT' signal, it acknowledges the interrupt request by activating the INTA' signal. Next, the interrupt source writes information indicating the cause of the interrupt onto the bus. According to the preferred embodiment, this information consists of the identifier of the signal processor requesting service and the identifier of the transcoder unit within the signal processor. The controller reads the interrupt source identifier from the data bus and deactivates the INTA' signal. Following this, the interrupt sequence can begin anew.

Figure 3:
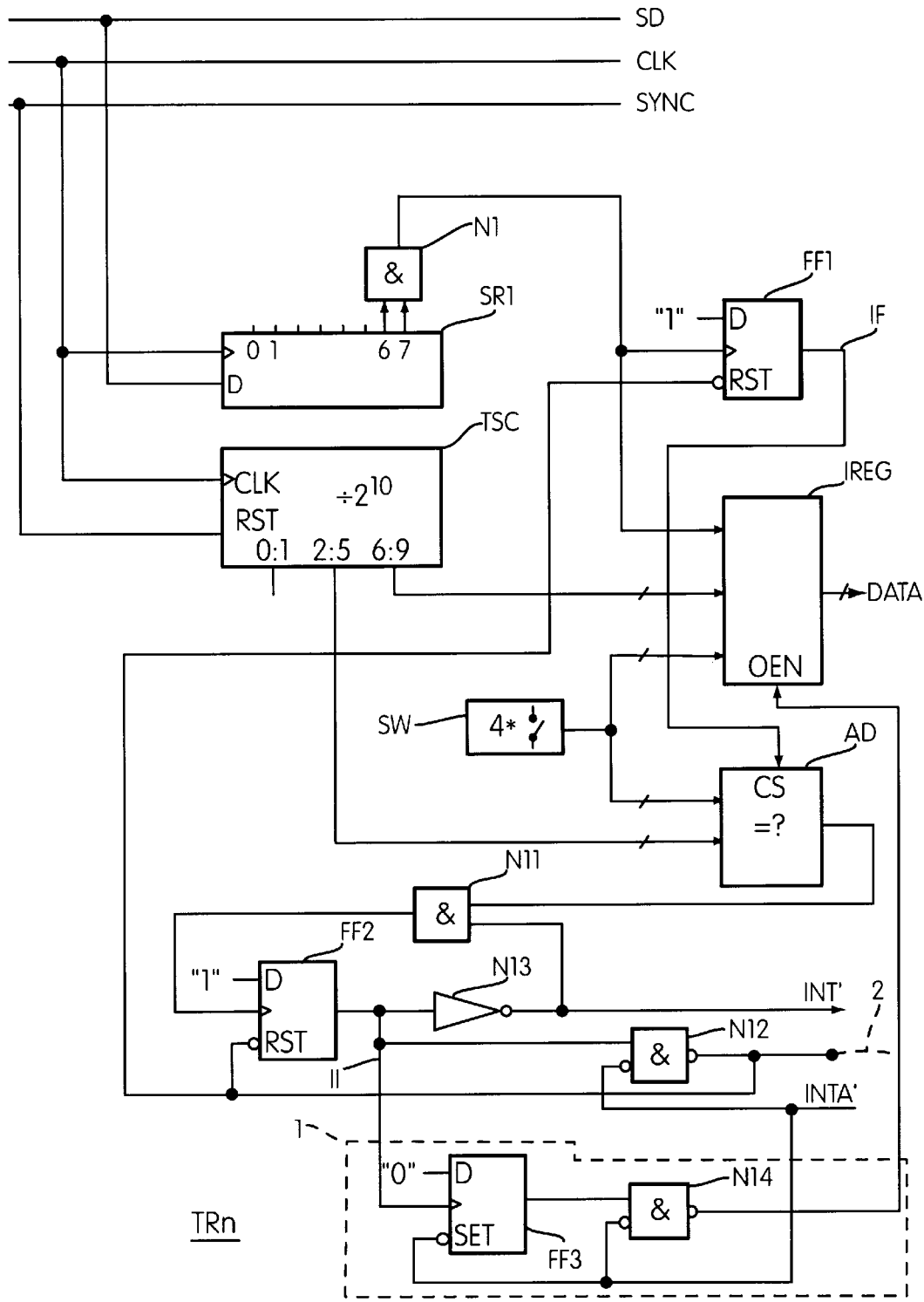

FIG. 3 illustrates signals associated with an interrupt by one of the transcoder units TRn in an one embodiment of the invention. The other features of the unit TRn are not illustrated. The circuit illustrated in FIG. 3 functions as follows. At first, it is assumed that block 1, demarcated by a broken line in FIG. 3, does not exist, and that the activation input OEN of the register IREG input is applied from the gate N12 output along line 2 denoted by a broken line. The circuit monitors a serial mode time multiplexed line SD (Serial Data). The transcoder unit TRn requests an interrupt when any of its signal processors DSPn (not shown) requires service. In this case, the signal indicating service requirement is not fed from the signal processors DSPn but a simpler circuit will be obtained by utilizing data on the time multiplexed bus SD. Due to time multiplexing, one device is capable of detecting that any of the signal processors DSP0–DSP15 requires service. This is detected by an AND gate N1 coupled to the register SR1. The reference mark of the register SR1 refers to a Shift Register, but the register SR1 can be implemented in other ways as well, for instance with successive flip-flops and timing logic associated thereto. As far as the invention is concerned, an essential matter is that the register SR1 and the gate N1 will recognize a situation when an 8 bit byte having ones in the two most significant bits has just been transferred on the bus, which in PCM signalling indicates the last byte of a 4 byte frame. This information is applied to flip-flop FF1 and an interrupt register IREG. The output IF (Interrupt Flag) of flip-flop FF1 acts as a chip select for an Address Decoder AD which compares the output bits 2–5 of a Time Slot Counter TSC to a reference address set by switches SW. Bits 0–1 from the counter TSC are not fed anywhere in this particular embodiment, but the counter TSC stages corresponding with them divide the frequency of the CLK signal by four. The switches SW may be located at each transcoder unit TRn or in their rear wiring. In the latter case, the units TRn may be identical. As the output bits 2–5 of the counter TSC have 16 possible states and the switches SW are positioned differently for each transcoder unit TR0–TR13, the output of the address comparator AD can only be active in one unit TRn at a time.

The output of the address comparator AD is functionally applied to a flip-flop FF2. There is an AND gate N11 between the aforementioned comparator AD and flip-flop FF2 to make sure that no interrupt will be requested if another unit TRn simultaneously asks for an interrupt. In the circuit of FIG. 3, the signals INT' and INTA' are active in state 0. State 0 of the INT' signal would therefore block the signal from the address comparator AD from reaching flip-flop FF2. Unless the apparatus is faulty, need for service can only exist in one transcoder unit TRn at a time, whereby the INT' is in state "1" and the signal from the address comparator is forwarded to flip-flop FF2 whose output II (Internal Interrupt) is buffered by means of an open collector type of buffer N13 to form an interrupt request signal INT' for the controller TRCO. Signal II is also fed via the AND gate N12 to the interrupt register IREG. A condition to the active signal II passing gate N12 and consequently producing an active Output Enable (OEN) signal to the interrupt register IREG is that INTA' signal is active, i.e. 0. The active INTA' signal resets flip-flops FF1 and FF2. When the OEN is active, the interrupt register IREG inserts, onto the bus DATA, the identifier of the transcoder unit TRn (from the switches SW) and the identifier of the signal processor DSPn (output bits 6–9 of the counter TSC). Having read the bus DATA, the controller TRCO deactivates the INTA' signal.

In the above configuration, of the circuit of FIG. 3, the output signals of the register IREG are active for only a very short time. They are deactivated when flip-flop FF2 is reset upon reset of the INTA' signal. It is now assumed that the conductor 2 does not exist, and block 1 has been installed. At the rising edge of the FF2 output, the output of FF3 also rises to "1" This signal is applied to gate N14 to whose second input an inverted INTA' signal is applied. Activation of the INTA' signal activates the output of gate N14, which in turn activates the outputs of the register IREG. Deactivation of the INTA' signal deactivates the output of gate N14, whereby the outputs of the register IREG change into high impedance outputs. In addition, the deactivation of the INTA' signal causes "0" to be stored in flip-flop FF3.

As the INTA' signal is activated, the output of flip-flop FF1 and the INT' signal are deactivated. As the INTA' signal is deactivated, the outputs of the register IREG change into high impedance outputs, and the interrupt sequence terminates.

Figure 4:
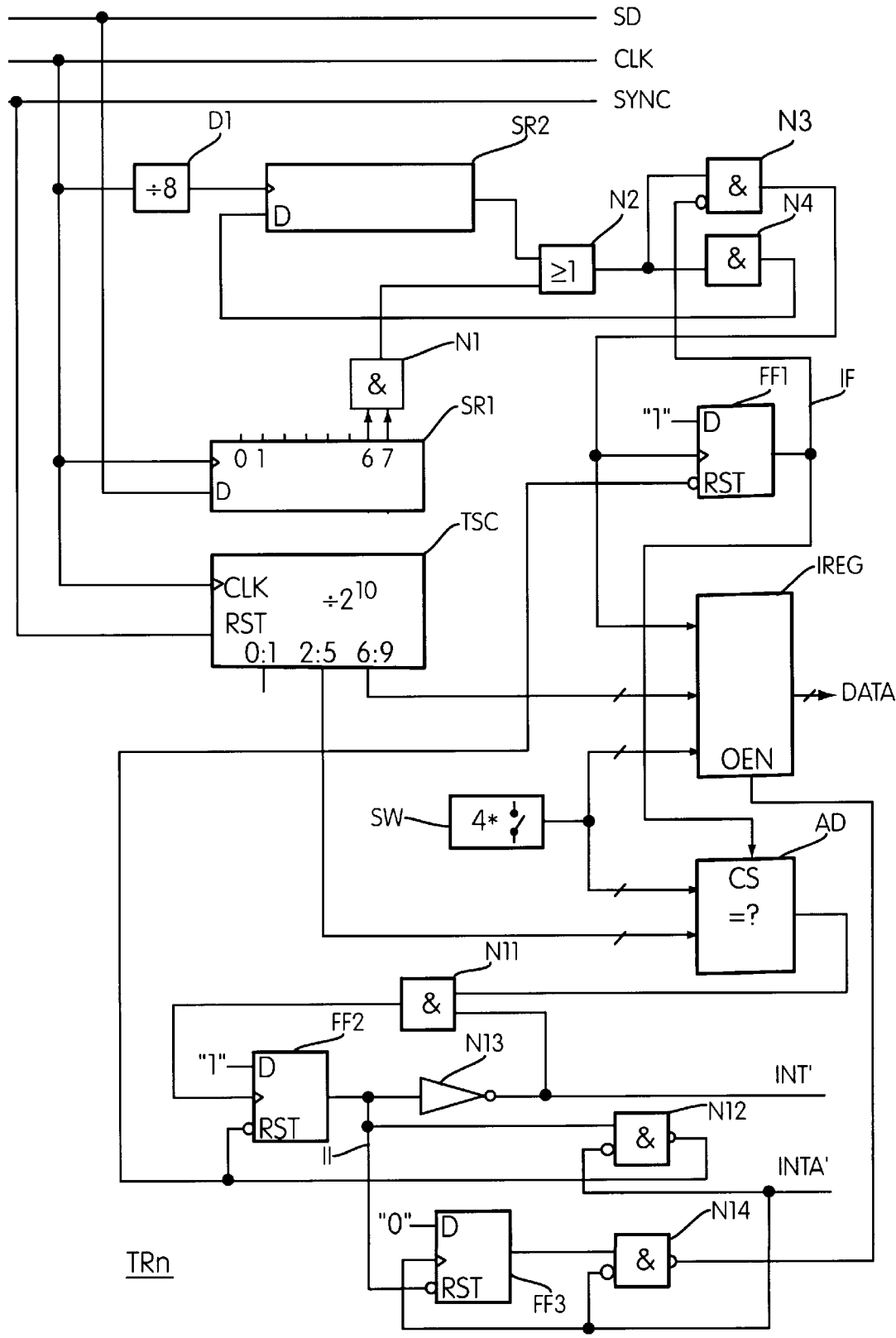

If the controller TRCO in the circuit of FIG. 3 has no time to serve an interrupt from a transcoder unit TRn before there is again need in the same unit TRn to interrupt, the previous interrupt request of the unit will be left without service. FIG. 4 illustrates the circuit of FIG. 3 supplemented so that the need for an interrupt will not be "forgotten" even if it cannot be attended to immediately. Same reference marks denote common parts of FIGS. 3 and 4. In the circuit according to FIG. 4, the output of AND gate N1 is applied to OR gate N2, to whose second input is applied the output of a shift register SR2. Output "1" of gate N2 indicates that a need exists of an interrupt (as in the circuit of FIG. 3) or that such a need existed prior to the current moment in time, and that this piece of information has now circulated via the shift register SR2. The clock frequency of the register SR2 will be obtained by dividing the frequency of the CLK signal by eight by means of a divider D1. Thus, when the register SR1 is stepped once for each bit of serial mode data SD, the register SR2 is stepped once for each 8-bit word of the serial mode data SD. The output of gate N2 is applied to AND gates N3 and N4. The N3 output follows the N2 output if the signal IF is "0", which means that no previous interrupt sequence currently being dealt with exists. The N4 output follows the N2 output if the signal IF is "1", which means that an interrupt sequence previously activated is currently in progress. In this case, the need for an interrupt will be stored in shift register SR2 until the signal processor in question is next allowed to request an interrupt.

In the above, an embodiment of the invention has been described in an environment where the clock signals CLK and SYNC exist for other uses as well. If it desired that the number of conductors required by the synchronization signals be reduced, the signals can be integrated in the same conductor for example so that the pulses corresponding to the SYNC signal somehow, for instance in length, differ from the pulses of the CLK signal.

Figure 5:
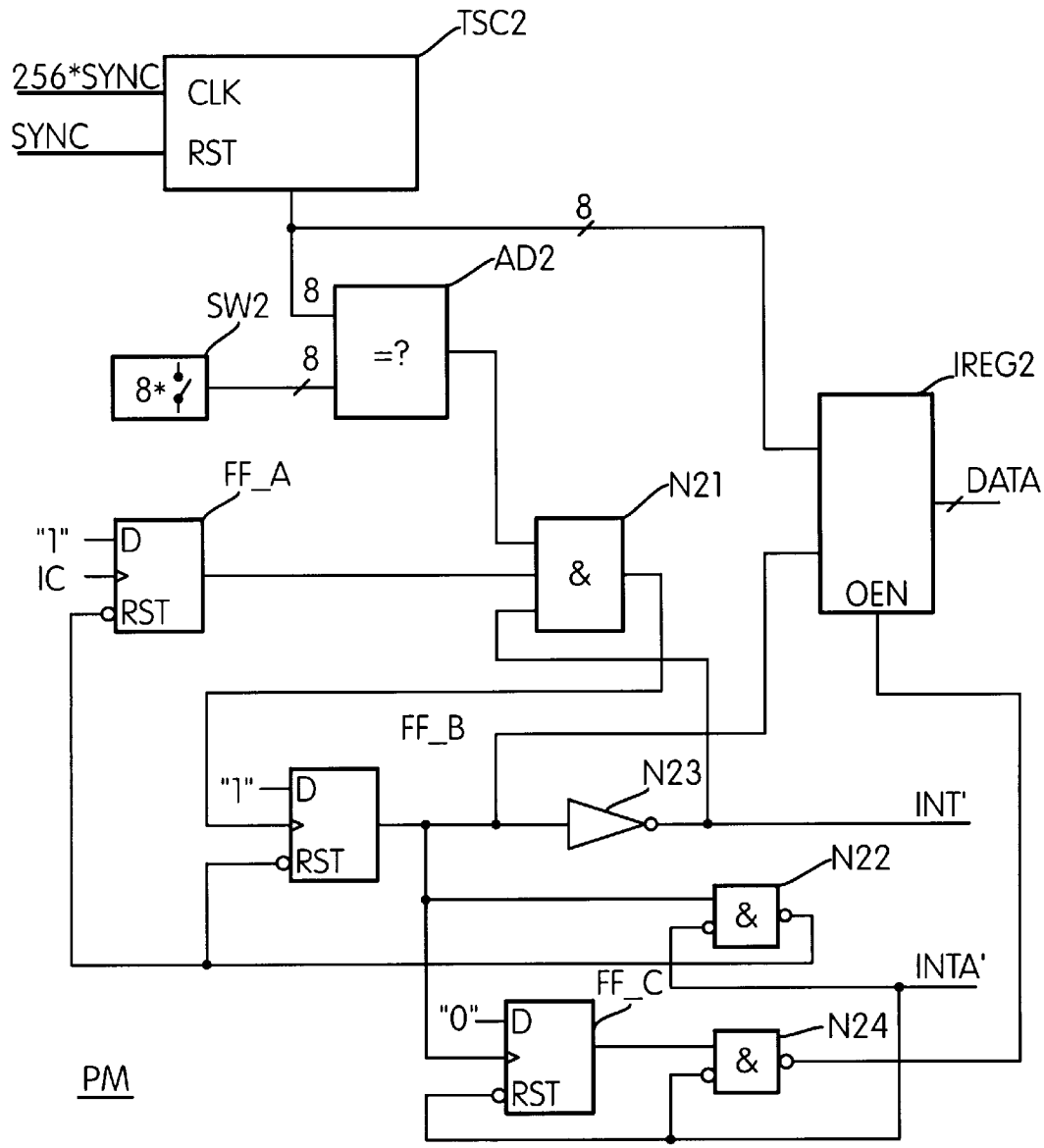

In the circuits illustrated in FIGS. 3 and 4, the need for an interrupt is not detected directly from the signal processors, but gate N1 coupled to shift register SR1 is used to identify that such a need exists. FIG. 5 illustrates an embodiment of the invention in an apparatus in which the need for an interrupt is recognized directly from the peripheral modules. Block 1 demarcated by a broken line was described in connection with FIG. 3. In the example, it is assumed that there are no more than 256 peripheral modules. An 8-bit counter TSC2 is synchronized with the SYNC signal and it is stepped by a signal 256*SYNC having a frequency 256 times that of the SYNC signal. Each possible peripheral module corresponds with one value of counter TSC2. The peripheral module indicates a need for an interrupt with a signal IC (Interrupt Cause). It is assumed that no new pulses of the IC signal arrive before the interrupt has been dealt with. A positive IC signal pulse raises the output of flip-flop FF_A to "1". This is applied to AND gate N21, the other inputs of which are the interrupt request signal INT' and the comparator AD2 output which is "1" if the TSC2 output matches the reference address arranged in the comparator AD2 by means of switches SW2. If all the gate N21 outputs are true, its output is true, and state "1" will be stored in flip-flop FF_B. If the FF_A output is "0", there is no need for an interrupt, and nothing happens in the circuit of FIG. 5. If the FF_A output is "1" and INT' signal is "0", an other interrupt source has activated the INT' signal. As a result, the gate N21 output will not be activated and the interrupt source will wait for its turn until the TSC2 output next matches the reference address ADDR arranged in the comparator AD2.

At the rising edge of the FF_B output, the address ADDR of the interrupt source is stored in the register IREG2. Instead of the ADDR, the TSC2 output could also be used because a condition for storing in the register IREG2 is that the TSC2 output matches the ADDR.

The FF_B output is applied to gate N22, to whose second input is applied an interrupt acknowledgement signal INTA' from the central equipment (not shown). After some time from the activation of the interrupt request signal INT', the central equipment acknowledges the interrupt by an INTA' signal which is in an inverted state connected to gate N22. The N22 output thereby changes to "0", which resets flip-flops FF_A and FF_B, and directs the signals connected to the data bus of the register IREG2 from high impedance state to active signals.

In the embodiment described above, each Peripheral Module PM has been given a dedicated time slot for the possible interrupt request, and each subperipheral module, such as a signal processor, a dedicated signal IC by means of which the subperipheral device can ask for an interrupt. The invention can also be applied so that specific bits of the time slot counter, for example the four least significant bits, correspond with the time slot assigned to each peripheral module, and the other bits, the four most significant bits, correspond with the sub-time slot assigned to each subperipheral module. There is no separate figure illustrating this, but on the basis of FIGS. 3–5 and the description related thereto this solution is easy to comprehend at least by persons skilled in the art.

The interrupt system according to the invention is simple and economical to implement because it only requires two signals, INT' and INTA', in addition to those that have to be installed in the apparatus anyway. The system of the invention is also equitable; in the long run the response time from the service request to carrying out the service is equal in length for all the peripheral modules. The third advantage of the interrupt system according to the invention is that as there are no simultaneous service requests, they can not cause down time either. Furthermore, the interrupt system of the invention is fast due to the fact that finding out the cause for the interrupt only requires one read transaction from the bus.

In the description above, the service requests targeted at the controller of the peripheral modules has been referred to as "interrupt", which usually means that after having received the service request the controller interrupts its current task, serves the peripheral module and continues the task that was interrupted. On the basis of the description, it is obvious that the invention and the different embodiments thereof are not dependent on how the controller carries out the service. Hence, the invention is applicable to handling any type of service requests.

The invention has been described by way of example in connection with transcoders connected to mobile services switching centers. It is obvious to a person skilled in the art that the basic idea of the invention can be applied to many other environments as well. It is particularly noteworthy that there are a variety of different ways regarding the implementation of the need for an interrupt and the clock signals CLK and SYNC. Therefore, the invention is not restricted to the above embodiments, but it may be applied widely without departing from the scope and spirit of the attached claims.

We claim:

1. A method for allowing interrupts in an apparatus comprising a controller and a plurality of peripheral modules, the peripheral modules each including subperipheral modules, the peripheral modules which request interrupts from the controller, the method comprising:

assigning a predetermined, recurrent time slot to each said peripheral module;

stepping a time slot counter in each said peripheral module based on a clock signal, the time slot counter for each said peripheral module being divided into sub-time slots, each said sub-time slot corresponding to one of the subperipheral modules of the peripheral module;

synchronizing the time slot counter with the peripheral modules using a synchronization signal; and in response to contents of the time slot counter and the sub-time slot of the time slot counter corresponding with the time slot assigned to the peripheral module and the subperipheral module, respectively, the peripheral module asking for an interrupt.

2. A method as claimed in claim 1, comprising:

requesting an interrupt immediately when need for an interrupt request arises, the immediate interrupt request being activated by one of the subperipheral modules.

3. A method for requesting interrupts in an apparatus comprising a controller and a plurality of peripheral modules, the peripheral modules each including subperipheral modules, the peripheral modules which request interrupts from the controller, the method comprising the following steps:

(i) monitoring a need for making an interrupt request;

(ii) stepping a time slot counter in each said peripheral module based on a clock signal, the time slot counter for each said peripheral module being divided into sub-time slots, each said sub-time slot corresponding to one of the subperipheral modules of the peripheral module, and synchronizing the time slot counter with the peripheral modules using a synchronization signal; and (iii) in response to a need for making an interrupt request detected in the monitoring step in one of said peripheral modules and in response to contents of the time slot counter and the sub-time slot of the time slot counter corresponding with the time slot in said one of said peripheral modules and the subperipheral module, respectively, the peripheral module requests an interrupt from the controller.

4. A method as claimed in claim 3, whereby an interrupt is only requested when no other peripheral module requests an interrupt simultaneously.

5. A method for implementing handshaking associated with an interrupt in an apparatus comprising a controller and a plurality of peripheral modules, the peripheral modules each including subperipheral modules, the peripheral modules which request interrupts from the controller, the method comprising:

(i) the peripheral module monitoring a need for making an interrupt request;

(ii) stepping a time slot counter in each said peripheral module based on a clock signal, the time slot counter for each said peripheral module being divided into sub-time slots, each said sub-time slot corresponding to one of the subperipheral modules of the peripheral module, and synchronizing the time slot counter with the peripheral modules using a synchronization signal;

(iii) the peripheral module activating an interrupt request signal when a need for making an interrupt request is detected in (i) and when the contents of the time slot counter and the sub-time slot of the time slot counter correspond with the time slot predetermined for the peripheral module and the subperipheral module, respectively;

(iv) in response to the interrupt request signal, the controller activating an interrupt acknowledgement signal;

(v) in response to the interrupt acknowledgement signal, the peripheral module inserting on the bus the identifier of the peripheral module requesting the interrupt;

(vi) the controller reading from the bus the identifier of the peripheral module requesting the interrupt, and deactivating the interrupt acknowledgement signal;

(vii) the peripheral module deactivating the interrupt request signal.

6. A method as claimed in claim 5, wherein the identifier of the peripheral module and the identifier of a subperipheral device are simultaneously inserted on the bus.

7. A method as claimed in claim 5, further including inserting the identifier of the subperipheral module on the bus.

8. A system for assigning interrupt turns to peripheral modules in an apparatus comprising a controller and a plurality of peripheral modules, the peripheral modules each including subperipheral modules, the peripheral modules which request an interrupt from the controller, the system comprising:

a time slot counter in each peripheral module, the time-slot counter assigning a predetermined, recurrent sub-time slot to each said subperipheral module so that the subperipheral module may request an interrupt only during said predetermined, recurrent sub-time slot;

a clock signal for recurrently stepping the time slot counter;

means for establishing a reference address;

a comparator, arranged to compare the value of the time slot counter to the reference address;

means responsive to the comparator for ensuring that the peripheral module may only ask for an interrupt during a time slot of the time slot counter assigned to the peripheral module; and a synchronization signal for synchronizing the time slot counter with the peripheral modules so that the frequency of the synchronization signal is the clock signal frequency divided by a factor, the factor at least equaling the number of the peripheral modules and being of the form $2^N$, where N is a positive integer.

9. A system as claimed in claim 8, wherein a conductor distinct from the clock signal is arranged for the synchronization signal.

10. A system as claimed in claim 8, wherein the synchronization signal travels in a conductor of the clock signal as an abnormal pulse of the clock signal.

11. A system as claimed in claim 8, further comprising, for each subperipheral module, a signal by means of which the subperipheral module can ask for an interrupt immediately when need for requesting an interrupt arises.

12. A system for requesting interrupts in an apparatus comprising a controller and a plurality of peripheral modules which have subperipheral modules, the peripheral modules which request an interrupt from the controller, the system comprising:

means for indicating a need for an interrupt;

a time slot counter in each said peripheral module, the time-slot counter assigning a Predetermined, recurrent sub-time slot to each said subperipheral module so that the subperipheral module may request an interrupt only during said predetermined, recurrent sub-time slot;

a clock signal for recurrently stepping the time slot counter;

means for establishing a reference address in every peripheral module;

a comparator, arranged to compare the value of the time slot counter to the reference address;

means responsive to the comparator for ensuring that the peripheral module only asks for an interrupt when the comparator determines that the contents of the time slot counter match the reference address of the peripheral module; and a synchronization signal for synchronizing the time slot counter to the peripheral modules so that the frequency of the synchronization signal is the clock signal frequency divided by a factor, the factor at least equaling the number of the peripheral modules and in addition being of the form $2^N$, where N is a positive integer.

13. A system as claimed in claim 12, wherein the system additionally comprises a register for storing the need for an interrupt if the controller has no time to serve the interrupt immediately with arousal of the interrupt need.

* * * * *